United States Patent [19]

Lowery

[11] 3,920,413

[45] Nov. 18, 1975

[54] PANEL FOR SELECTIVELY ABSORBING SOLAR THERMAL ENERGY AND THE METHOD OF PRODUCING SAID PANEL

[75] Inventor: James R. Lowery, Decatur, Ala.

[73] Assignee: The United States of America as represented by the Administrator of the National Aeronautics and Space Administration, Washington, D.C.

[22] Filed: Apr. 5, 1974

[21] Appl. No.: 458,484

[52] U.S. Cl. .................... 29/197; 29/194; 29/195; 126/270; 204/32 R; 204/33; 204/38 A; 204/40; 204/42; 204/49; 136/206
[51] Int. Cl.² .................... B23P 3/00; C25D 5/12
[58] Field of Search .......... 204/40, 42; 29/194, 197, 29/195, 197.5; 126/270

[56] References Cited
UNITED STATES PATENTS

| | | | |
|---|---|---|---|
| 2,142,564 | 1/1939 | Korplun | 204/33 X |
| 2,473,163 | 6/1949 | McCoy | 204/42 |
| 2,844,530 | 7/1958 | Wesley et al. | 204/40 |
| 2,891,879 | 6/1959 | Rohrer | 117/201 |
| 2,985,567 | 5/1961 | Pinkerton | 204/41 |
| 3,531,379 | 9/1970 | Peach | 204/33 |
| 3,720,588 | 3/1973 | Oleson et al. | 204/51 |
| 3,741,882 | 6/1973 | Schaer | 204/42 |

OTHER PUBLICATIONS

F. Daniels, "Direct Use of the Sun's Energy," Chapter 12, Yale Univ. Press (1964).
D. Fishlock, "Metal Colouring," Robert Draper Ltd., England, 1962, pp. 119–123.
J. K. Dennis & T. E. Such, "Nickel & Chromium Plating," Wiley, N.Y. (1972), pp. 68–69, 74.

*Primary Examiner*—John H. Mack
*Assistant Examiner*—Aaron Weisstuch
*Attorney, Agent, or Firm*—Wayland H. Riggins; L. D. Wofford, Jr.; John R. Manning

[57] ABSTRACT

A panel for selectively absorbing solar thermal energy comprising a metallic substrate, a layer of bright metallic material carried on the substrate, and a solar thermal energy absorbing coating carried on the bright metallic material. A layer of zinc is interposed between the metal substrate and the layer of bright material or the metallic substrate can be anodized for receiving the layer of bright metallic material. Also disclosed is the method for producing the coating which selectively absorbs solar thermal energy.

6 Claims, 2 Drawing Figures

PANEL FOR SELECTIVELY ABSORBING SOLAR THERMAL ENERGY AND THE METHOD OF PRODUCING SAID PANEL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a coated metal substrate which absorbs solar thermal energy selectively and to a method for coating metal substrates to provide a composite which absorbs solar thermal energy selectively.

Metal bodies which selectively absorb solar thermal energy function in this fashion because of a high $\alpha/\epsilon$ ratio, wherein $\alpha$ is absorptance and $\epsilon$ is emittance. Metal bodies having requisite $\alpha/\epsilon$ ratios can be fabricated so that the heat absorbed is transferred to tubes carried in the metal body for subsequent use in heating and cooling operations.

Among coated metals which can be used for fabrication of selective solar thermal energy absorbers is aluminum. Coated aluminum absorbers are particularly valuable for heat exchange units because of the lightness of aluminum, with the resultant decrease in the complexity and weight of structural elements required for support thereof, and because of the ease with which aluminum can be machined and fabricated.

McCoy, in U.S. Pat. No. 2,473,163, teaches that either bright or dull nickel can be plated on aluminum, following an anodic oxidation step to prepare the surface of the aluminum. However, McCoy does not indicate the sequential application of a bright nickel coating and a black nickel coating to an anodized or zinc coated aluminum base to produce a product having selective thermal absorptivity properties.

Peach, in U.S. Pat. No. 3,531,379 teaches a process for coating an aluminum object wherein a cathodic reduction step follows an anodic oxidation, but does not teach the preparation of a coating which is selective with respect to thermal absorption or emission properties.

Reinert, in U.S. Pat. No. 3,594,288, teaches coating aluminum with an adherent, wearable nickel surface, but does not suggest that the coating obtained exhibits any especially desirable thermal selectivity characteristics.

Chamberlin, in U.S. Pat. No. 3,586,541, describes the preparation of a photosensitive device comprising an aluminum foil to which is adhered a plurality of flexible thin films, at least two of which form a photovoltaic junction. This reference does not contemplate the fabrication of a thermally selective device on a solid aluminum substrate. p Thus, it will be appreciated that the prior art teaches neither that a metallic substrate, such as aluminum, can be coated to afford a thermally selective system nor teaches a method for preparing a coated metallic substrate which absorbs solar thermal energy in a selective manner. Moreover, the prior art does not disclose the sequential application of a bright nickel coating and a black nickel coating to an anodized or zinc coated aluminum base to produce a product having selective thermal absorptivity properties.

SUMMARY OF THE INVENTION

It has been found, in accordance with this invention, that a coated metal substrate which selectively absorbs solar thermal energy is made by the steps of cleaning the metallic substrate, preparing said metallic substrate to receive a brightening layer, applying the brightening layer to said metallic substrate and adhering a very thin solar thermal energy absorbing coating to said brightening layer.

More particularly, it has been found that an aluminum metal substrate can be cleaned, prepared to receive a brightening layer, coated with the brightening layer and further coated with a very thin solar thermal energy absorbing coating of black nickel.

Accordingly, it is a general object of the present invention to provide a panel including a metallic substrate with a solar thermal energy absorbing coating of black nickel thereon.

It is also an object of this invention to provide a method for preparing metallic substrates which absorb solar thermal energy selectively by the steps of cleaning the metallic substrate, preparing the metallic substrate to receive the brightening layer, applying the brightening layer to said metallic substrate and adhering a solar thermal energy absorbing layer to said brightening layer.

More specifically, it is an object of this invention to provide a method for coating an aluminum substrate to afford a workpiece which selectively absorbs solar thermal energy.

DESCRIPTION OF THE INVENTION

Figure 1:
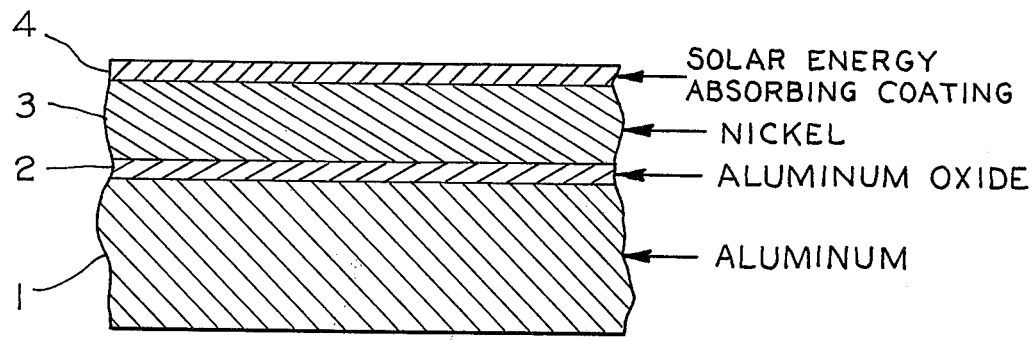
FIG. 1 is a sectional view of a panel constructed in accordance with the present invention.

"Metallic substrate," as used in the specification and claims, means any metallic material which has good heat exchange properties and which can be fabricated into a structure which can carry tubes or other means for subsequent heat exchange in a heating or cooling operation. Among suitable metallic substrates are copper, aluminum, and various ferrous alloys, such as steel. For the purposes of this invention, aluminum is preferred as the metallic substrate.

It will be appreciated that "aluminum," as used in the specification and claims, means essentially pure aluminum such as alloy type AA 1,100, which contains about 1.0% of iron and silicon, 0.20% of copper, 0.05% of manganese, and 0.10% of zinc. Also included within the definition of aluminum are Al-Mn alloys, such as AA 3,003; Al-Mg alloys, e.g. AA 5,005; Al-Mg-Si alloys, for example, AA 6,061; Al-Cu-Mg alloys, e.g. AA 2,014 and 2,024; and Al-Mg-Zn alloys such as AA 7,075. The compositional details of the foregoing types of aluminum alloys can be found in Kirk-Othmer, "Encyclopedia of Chemical Technology," II, Volume 1, Interscience Publishers, New York (1963), at 975. Aluminum alloys especially preferred for the practice of this invention include the Al-Cu-Mg alloys, e.g. AA 2,014 and 2,024; and essentially pure aluminum, as exemplified by AA 1,100.

Metallic substrates used in the practice of this invention may be cleaned by use of an acidic or alkaline cleaning bath. The commercially available alkaline cleaning materials, such as those sold by Enthone, Inc. of New Haven, Conn., are especially suitable.

The phrase "preparing said metallic substrate to receive a brightening layer" means any process which enhances the adherence of a brightening layer to the metallic substrate. For the case in which the metallic substrate is aluminum, the preparation of the aluminum substrate may be selected from either coating with zinc or anodization. Although either of these methods provides an acceptable base for the brightening layer, the zinc technique is preferred for the purposes of this invention, particularly when processing large components.

"Applying the brightening layer to said metallic substrate," as used herein, means application of a bright metallic layer which has a low thermal emissivity, $\epsilon$. Suitable brightening layers for the purpose of this invention include copper, tin, and nickel. Among the materials especially preferred as the brightening layer is nickel, which can be applied electrolytically.

Among the electrolytic bright nickel coating techniques operable for the purposes of this invention are those of McCoy, supra, involving the use of a solution containing from about 32 to about 36 ounces of nickel sulfate, from about 5 to about 8 ounces of nickel chloride and from about 5 to about 5.5 ounces of boric acid per gallon. Also, the solution contains the customary organic brightening and wetting agents. The solution preferably has a pH from about 2.5 to about 3.5 and is applied at a current density up to about 40 amperes per square foot at a bath temperature in the range from about 115° to about 140° F.

Also useful in the practice of this invention to produce a bright nickel coating are the compositions and techniques set forth in the Peach and Reinert patents, supra.

The phrase "solar energy absorbing coating" as used herein means a heat absorptive coating characterized by a high $\alpha$ value (making it a good absorber) and a low emittance value because of its extreme thinness (making it a poor thermal emitter). The thickness of the solar energy absorbing coating is preferably of the order of 1,500 A thick.

The solar energy absorbing coating is applied by an electroplating step for the period of time required to produce a thin layer of alloy which is grey to black in appearance. A coating bath which can be used for this step consists of an aqueous solution of nickel sulfate hexahydrate, nickel ammonium sulfate hexahydrate, zinc sulfate heptahydrate and sodium thiocyanate.

Conditions for plating the above coating composition on the prepared metallic substrate are controlled so that the pH of the black nickel plating solution is between 5.4 and 6.1, and preferably between about 5.6 and 5.9. The temperature for plating is room temperature, that is, from about 60° F to about 90° F. The current density for the plating operation is controlled between about 0.5 and about 4.0 amperes per square foot, but is preferably about 4.0 amperes per square foot.

In FIG. 1 is represented the structure of a typical coated metallic substrate prepared in accordance with this invention. The metallic substrate 1 is typically aluminum metal, which is anodized to produce a surface layer 2 of aluminum oxide to which the brightening layer 3 adheres. The solar energy absorbing coating 4 such as black nickel, is coated thereon.

Figure 2:
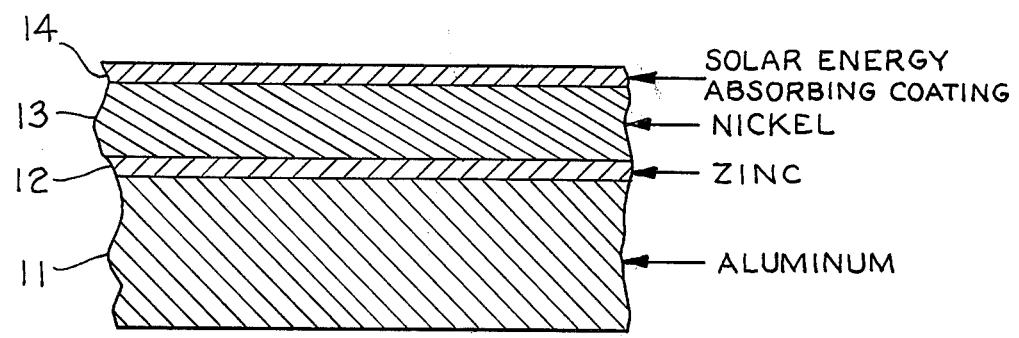
FIG. 2 is a sectional view illustrating a modified form of the invention.

In another typical structure prepared in accordance with this invention, and represented by FIG. 2, the metallic substrate 11, e.g. aluminum, is coated with zinc 12 to which is adhered the brightening layer, e.g. bright nickel 13; and then the solar energy absorbing coating, such as black nickel 14.

DESCRIPTION OF THE PREFERRED EMBODIMENT

The preferred method for making the coated metal substrate which selectively absorbs thermal energy comprises the steps of cleaning an aluminum substrate, applying a thin film of zinc of about 1,500 to 2,000 angstroms on which to plate first bright nickel and then black nickel. Conditions for the zincating of aluminum consists of immersing the clean aluminum surface into a bath containing about 13 ounces per gallon of zinc oxide and about 70 ounces per gallon of sodium hydroxide for 30 seconds to one minute at a bath temperature of around 75° F. A zinc immersion bath manufactured by Diversey Corporation of Chicago, Illinois is also suitable. The trade name of this bath is "Zinc-8".

Conditions for the anodization of aluminum are selected in accordance with the particular aluminum alloy used. For the Al-Cu-Mg alloys, such as AA 2,014 and 2,024, the preferred bath composition contains between about 300 and about 400 grams of phosphoric acid per liter of water. However, a particularly preferred bath composition contains on the order of 350 grams of phosphoric acid per liter of water. The relatively pure aluminum alloys, e.g. AA 1,100, preferably are anodized in a bath containing from about 400 to about 600 grams of phosphoric acid per liter of water, most preferably about 500 grams of phosphoric acid per liter of water.

The preferred bath for the nickel brightening layer contains from about 30 to about 50 ounces of nickel (II) sulfate hexahydrate, from about 5 to about 10 ounces of nickel (II) chloride hexahydrate, and from about 3 to about 7.5 ounces of boric acid per gallon of aqueous solution. The plating bath also contains up to about 5% by volume of one or more "brightener" compositions, such as brightener No. 7 and brightener No. 2-WL, and up to about 1.0% by volume of non-pitting agent, such as non-pitting agent No. 22. Each of the aforesaid materials is a product of the Udylite Corporation of Detroit, Mich.

The most preferred bath composition is of the order of about 40 ounces of nickel (II) sulfate hexahydrate, about 8 ounces of nickel (II) chloride hexahydrate, about 5.5 ounces of boric acid, about 0.125% by volume of brightener No. 2-WL, about 2.0% by volume of brightener No. 7 and about 0.5% by volume of non-pitting agent No. 22 per gallon of solution. The pH of the solution is thus from 3.5 to 4.8.

Application of the bright nickel layer is preferably done at a current density from about 15 amperes to about 25 amperes per square foot at a bath temperature in the range of from about 120° to about 140° F. for a time sufficient to apply a coating from about 0.00025 to about 0.00075 inches in thickness. For the application of a coating about 0.0005 inches in thickness, about 30 minutes of plating at a current density of 20 amperes per square inch is required.

The preferred bath for application of the black nickel solar thermal energy absorbing coating contains from about 5 to about 15 ounces of nickel (II) ammonium sulfate hexahydrate, from about 4 to about 6 ounces of zinc sulfate hexahydrate, from about 1 to about 3 ounces of sodium thiocyanate and about 10 ounces of nickel sulfate hexahydrate per gallon of solution.

Preferred operating conditions for this bath include a pH of 5.6 to 5.9 at room temperature and a current density between about 0.5 and 4.0 amperes per square foot. Using 4.0 amps per square foot produces a coating with better optical properties (higher $\alpha$ values without much sacrifice in increased emittance) than the lower current density. The time for plating is preferably that which produces a coating which exhibits a solar absorptance, $\alpha$, of at least about 0.90 and a thermal or infrared emittance, $\epsilon$, of not more than about 0.06. At a current density of 0.5 ampere per square foot, about 5 minutes of plating time are required. At 4 ampere per square foot, a 30 seconds plating time is required.

It will be understood that the significance of the $\alpha/\epsilon$ ratio, where $\alpha$ is solar absorptance and $\epsilon$ is emittance, is that a high $\alpha/\epsilon$ ratio indicates a high efficiency in terms of collecting solar thermal radiation. When conventional black nickel coatings are prepared on aluminum, such coatings are dark black, relatively thick, and have a high solar absorptance as well as high emittance, so that the $\alpha/\epsilon$ ratio approaches unity or less. Thus, it is imperative that the black nickel solar absorber layer be very thin, preferably of the order of 1,500 A. The efficiency of the selective solar layer decreases to the extent that it would not be considered suitable for collecting solar energy outside of a thickness range of between 800 and 5000 A.

It will also be understood that metallic substrates other than aluminum can be used in the practice of this invention. When steel or other ferrous alloy is used as the metallic substrate, the metallic surface is generally prepared for the plating steps by a pickling operation in an acidic bath, such as in hydrochloric or muriatic acid.

For a clearer understanding of this invention, specific examples of it are set forth below. These examples are merely illustrative and are not to be understood as limiting the scope and underlying principles of this invention in any way.

EXAMPLE 1

A piece of aluminum alloy 2,014 4 square inches in area was anodized for 10 minutes in a solution containing 350 grams of phosphoric acid per liter of water. The anodization was done at a current density of about 12 amperes per square foot at a bath temperature of about 80° F. The cathode was lead.

The anodized aluminum substrate was rinsed with water and plated with bright nickel in a bath containing 40 ounces of nickel (II) sulfate hexahydrate, 8 ounces of nickel (II) chloride hexahydrate, 5.5 ounces of boric acid, 0.125% by volume of brightener No. 2-WL, 0.5% by volume of non-pitting agent No. 22 and 2.0% by volume of brightener No. 7 per gallon of aqueous solution.

2-WL is a commercially available additive manufactured by Udylite Corporation of Detroit, Mich., which imparts to the solution the ability to increase the brightness of the deposit. Such brighteners usually include organic substances such as gelatin, peperonal, molasses, sugar, destrin, furfural and sulfonic acids.

Non-pitting agent No. 22 is a commercially available additive manufactured by Udylite Corporation of Detroit, Mich. which is used for the purposes of preventing hydrogen pits. Such additives usually include such substances as sodium lauryl sulfate, sulfuric acid and phosphoric acid esters of higher alcohols and aryl sulphonic acids.

Brightener No. 7 is about the same as 2-WL with respect to function and composition and is also manufactured by Udylite Corporation of Detroit, Mich.

The bright nickel plating operation was done at a current density of about 20 amperes per square foot and a bath temperature of 120°–140° F. for about 30 minutes to produce a coating of bright nickel about 0.0005 inch in thickness.

In cases in which the bright nickel coating was not bright in appearance, the workpiece was buffed, cleaned in an alkaline cleaner "Enbond S-64" for 15–20 minutes at 150°–200° F., dipped in a solution of hydrochloric acid (30% by volume) for 1–2 minutes at 70° – 80° F., and rinsed with water.

Enbond S-64 alkaline cleaner is manufactured by Enthone, Inc. of New Haven, Conn. Alkaline cleaners generally contain highly alkaline salts such as sodium hydroxide, silicates and carbonates.

Application of the black nickel was done from a bath containing 10 ounces of nickel (II) sulfate hexahydrate, 6 ounces of nickel (II) ammonium sulfate hexahydrate, 5 ounces of zinc sulfate heptahydrate and 2 ounces of sodium thiocyanate per gallon of aqueous solution.

The black plating bath was kept at pH 5.6 – 5.9 at room temperature (about 72° F.) at a current density of 0.5 amperes per square foot. The resulting black nickel coating varied in appearance from black to bluish-grey. An aluminum sample plated for 5 minutes in the black nickel bath was evaluated by the use of a Model DB-100 infrared reflectometer and a Model MS-250 solar reflectometer. Both of these instruments are manufactured by Gier Dunkle Instruments, Inc. of Santa Monica, Calif. The panel had a solar reflectance of 10% and an infrared reflectance of 94%. That is, the panel absorbed 90% of the solar radiation and emitted 6% of the heat. Thus, $\alpha/\epsilon$ is 0.90/.06 or about 15.

EXAMPLE 2

A piece of 2,014 aluminum, sixteen square inches in area, was cleaned by being soaked in an alkaline cleaner Enbond S-64 and anodized in an aqueous solution containing 350 grams of phosphoric acid per liter. A voltage of 20 volts was applied for 10 minutes so that the effective current density was 12 amperes per square foot. The panel was rinsed with water and coated with the "bright" coating of Example 1 by application of a direct current. The current was applied slowly until a current density of 20 amperes per square foot was reached. The plating operation was continued for 30 minutes.

The nickel-plated piece was removed from the bath, rinsed with water, and buffed with a cloth wheel using a C-41 bar, a buffing compound available from Schaffner-Emsworth of Pittsburg, Pa. and consisting of a medium amount of grease with sufficient binders for all hand buffing applications and most automatic applications.

The resulting bright panel was immersed in the alkaline cleaner (Enbond S-64) for 15 minutes at a bath temperature of 180° F. The panel was rinsed with water, soaked in 30% hydrochloric acid (by volume) for 1–2 minutes, and rinsed with water.

The panel was placed in the black nickel bath described in Example 1 with no current. Direct current was then applied and gradually raised until a current density of 0.5 amperes per square foot was maintained for exactly 5 minutes. The panel was removed from the bath and dried with a paper tissue. It was grey-black in appearance and had a glossy surface.

Solar reflectance, as measured by a Gier Dunkle instrument was 9% and infrared reflectance was 95%. Since the panel reflected only 9% of solar radiation, 91% was absorbed; that is, $\alpha$ was 0.91. Since the panel reflected 95% of the infrared radiation, only 5% was lost or emitted as heat; that is, $\epsilon$ was 0.05. Thus, for this sample, $\alpha/\epsilon$ was 0.91/0.05, that is 18.2.

EXAMPLE 3

A piece of aluminum alloy 1,100 (about 100 square inches) was soaked for 15 minutes at about 140° F. in a commercially available alkaline cleaner (Altrex) produced by Wyandotte Corporation of Wyandotte, Mich. The composition was not known, but cleaners of this type generally contain highly alkaline salts such as sodium hydroxides, silicates, and carbonates.

The aluminum piece was rinsed in water and immersed in a bright dip consisting of 80% phosphoric acid, 2–2 ½ percent Nitric Acid, 1–2% sulfuric acid, 100 parts per million (PPM) copper sulfate, and 20–40 grams per liter of aluminum.

The piece of aluminum was rinsed with water and immersed in a zinc bath, "Zinc-8" for 30 seconds at a temperature of 70° to 90° F. The composition of the "Zinc-8" bath was not known, but such baths usually contain around 70 ounces per gallon sodium hydroxide and around 13 ounces per gallon of zinc oxide. The "Zinc-8" bath is manufactured by Diversey Corporation of Chicago, Ill.

The treated workpiece was rinsed with water and coated with bright nickel as described in Examples 1 and 2 and coated with black nickel, using a bath composition described in Example 1, at a current density of 4 amperes per square foot for 30 seconds. The workpiece was removed from the bath and dried in air.

The $\alpha$ value of this panel was 0.87 and the $\epsilon$ value was 0.06.

EXAMPLE 4

A piece of aluminum alloy, 6 square feet in area, was soaked for 15 minutes at about 140° F. in a commercially available alkaline cleaner, "Altrex," (described in Example 3). The aluminum piece was rinsed in water and immersed in a bright dip using a bath composition described in Example 3, coated with zinc and nickel as described in Example 3, and coated with black nickel using a bath composition described in Examples 1, 2 and 3 at a current density of 4 amperes per square foot for 30 seconds. The workpiece was removed from the bath and dried in air.

The $\alpha$ value of this panel was 0.93 and the $\epsilon$ value was 0.06 as indicated by the previously described Gier Dunkle Instruments.

Two hundred and nine panels of the type described in Example 4 have been plated according to the procedure described in Example 4 for actual application on a roof of a building to collect solar energy for heating and cooling the building. The average $\alpha$ value of these 209 panels was 0.92 and the average $\epsilon$ value was 0.06 as indicated by the previously described Gier Dunkle Instruments.

PERFORMANCE TESTS

Results of a prototype operation employing 7 such panels coated as in Example 4, and comprising about 42 square feet of surface area, showed that temperatures as high as 306° F. could be reached on the back side of panels exposed to the sun at a 45° angle to the south. Results of this pilot plant operation also showed that a water-ethylene glycol mixture could be heated to around 228° F. when this mixture was pumped through transfer tubes or channels (at the rate of about 1 gallon per minute) built into the solar energy collecting plates. These values were produced from a solar flux of around 294 BTU's per hour per square foot of surface area on a sunshiny day in Jan., 1974 at Huntsville, Ala. where the outside temperature was about 69 degrees F.

What is claimed is:

1. A method for producing on a metallic substrate a coating which selectively absorbs solar thermal energy, which comprises the steps of cleaning the metallic substrate, preparing said metallic substrate to receive a brightening layer of bright nickel, electroplating the brightening layer of bright nickel to said metallic substrate, and applying a solar thermal energy absorbing coating of black nickel to said bright nickel brightening layer, said black nickel coating being applied by electroplating at room temperature from an aqueous bath containing nickel (II) sulfate hexahydrate, nickel (II) ammonium sulfate hexahydrate, zinc sulfate heptahydrate and sodium thiocyanate at a pH from about 5.6 to about 5.9 and a current density between about 0.5 and about 4.0 amperes per square foot, said black nickel coating being between 800 and 5,000 angstroms in thickness whereby the resulting coated metallic substrate has a solar absorptance ($\alpha$) of at least 0.90 and a thermal emissivity ($\epsilon$) not exceeding 0.06.

2. The method as set forth in claim 1 wherein said metallic substrate is aluminum, said metallic substrate being prepared to receive said brightening layer by anodization in an aqueous solution containing phosphoric acid, said brightening layer being applied by electroplating from an aqueous bath containing at least nickel (II) sulfate hexahydrate, a nickel (II) chloride hexahydrate and boric acid at a current density from about 15 to 25 amperes per square foot at a bath temperature from about 120° to about 140° F to produce a coating from about 0.00025 to about 0.00075 inches in thickness.

3. The method of claim 1 wherein said metallic substrate is aluminum and said metallic surface is prepared to receive said brightening layer by applying an immersion layer of zinc.

4. A panel for absorbing solar thermal energy comprising:
an aluminum substrate;
a layer of bright nickel carried on said substrate;
a solar thermal energy absorbing coating of black nickel carried on said bright nickel distal from said metallic substrate;
said black nickel coating being between 800 angstroms and 5,000 angstroms in thickness;
said panel having a solar absorptance ($\alpha$) of at least 0.90 and a thermal emittance ($\epsilon$) less than about 0.06;
a layer of zinc being interposed between said aluminum substrate and said layer of bright nickel material.

5. A panel for absorbing solar thermal energy comprising:
a metallic substrate;
a layer of bright nickel carried on said substrate;

a solar thermal energy absorbing coating of black nickel carried on said bright nickel distal from said metallic substrate;

said black nickel coating being about 1,500 angstroms in thickness;

said panel having a solar absorptance ($\alpha$) of at least 0.90 and a thermal emittance ($\epsilon$) less than about 0.06.

6. A panel for absorbing solar thermal energy comprising:

an aluminum substrate;

a layer of bright nickel carried on said substrate;

a solar thermal energy absorbing coating of black nickel carried on said bright nickel distal from said metallic substrate;

said black nickel coating being between 800 angstroms and 5,000 angstroms in thickness;

said panel having a solar absorptance ($\alpha$) of at least 0.90 and a thermal emittance ($\epsilon$) less than about 0.06;

said aluminum substrate being anodized for receiving said layer of bright nickel.

* * * * *